July 7, 1931.  E. PRICE ET AL  1,813,464
VALVE
Filed Aug. 18, 1928    2 Sheets-Sheet 1

INVENTORS
EMIL PRICE
WILLIAM A. PFISTER
BY Munn & Co
ATTORNEYS

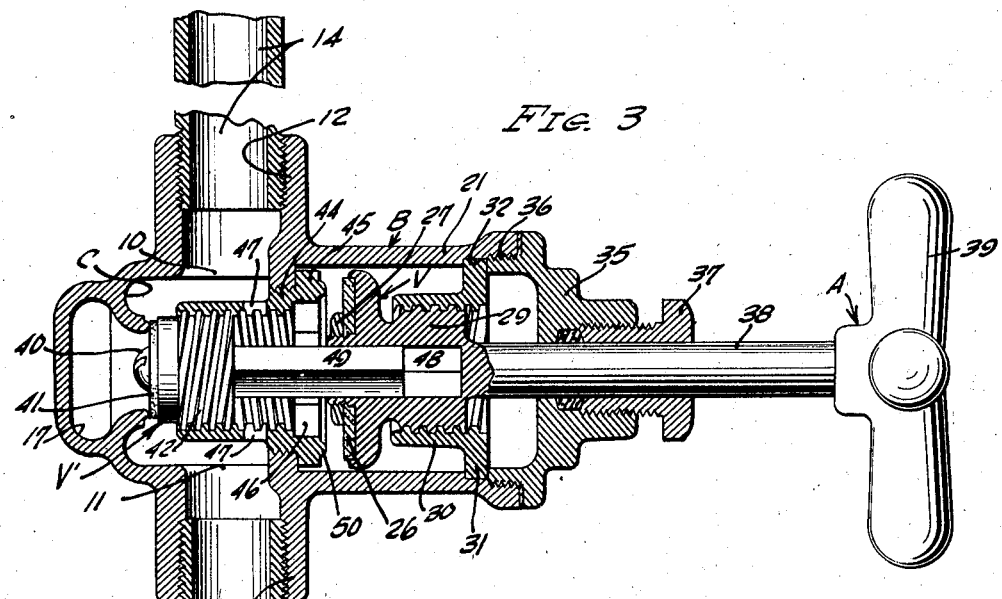
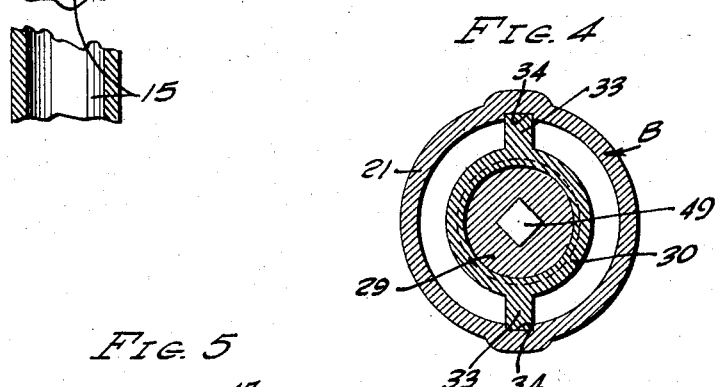
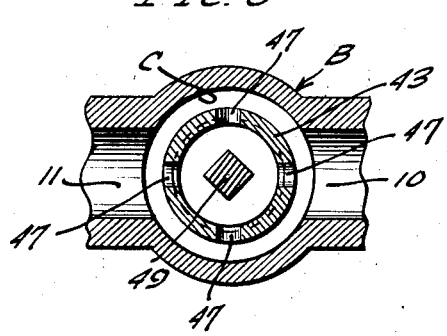

Patented July 7, 1931

1,813,464

UNITED STATES PATENT OFFICE

EMIL PRICE AND WILLIAM A. PFISTER, OF LOS ANGELES, CALIFORNIA

VALVE

Application filed August 18, 1928. Serial No. 300,530.

Our invention relates to and has for a purpose the provision of a valve by which the flow of fluid from a plurality of sources can be controlled by a single actuator to cause the flow of fluid from one source to be discontinued and the flow of fluid from at least one other of the sources, permitted, or vice versa according as the actuator is moved to one position or another.

It is a further purpose of our invention to provide a valve of the above described character, which is particularly adapted, although not necessarily, for use in a combination bath and shower installation, and by which water can be diverted at will to discharge through one outlet, to the bath tub or discharge through another outlet to a shower head.

It is another purpose of our invention to provide a diverting valve characterized by the simplicity and durability of construction and the ease of operation from a single actuator, of its mechanism embodying a pair of valves controlling outlets from a chamber, and having mountings in which the valves are threaded reversely from each other, with the valves operatively connected to each other for rotation as a unit by the single actuator, and being so disposed relative to the respective outlets they control, that one valve will close one outlet and the other valve will open the other outlet or vice versa, according as the valves are rotated as a unit in one direction or the other.

We will describe only one form of valve embodying our invention and will then point out the novel features thereof in claims.

In the accompanying drawings

Fig. 3 is a sectional view taken on the line 3—3 of Fig. 1 and looking in the direction of the arrows;

Figure 1:
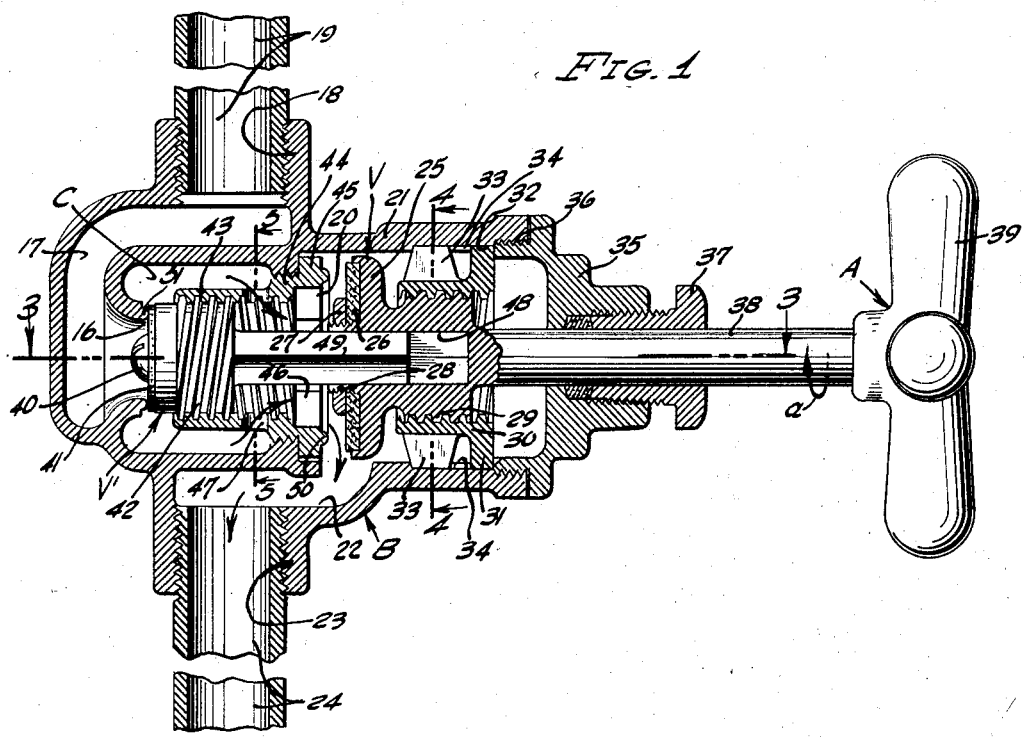
Fig. 1 is a view showing in vertical longitudinal section one form of valve embodying our invention, and illustrating one position occupied by the valve.

Figs. 4 and 5 are sectional views taken respectively on the lines 4—4 and 5—5 of Fig. 1 and looking in the direction of the arrows.

Referring specifically to the drawings in which similar reference characters designate similar parts in each of the several views, our invention in its broadest aspect contemplates the provision of a valve by which the flow of fluid from a plurality of sources can be controlled by a single actuating means to cause the flow of fluid from one source to be discontinued and the flow of fluid from at least one other of the sources, permitted, or vice versa according as the actuating means is moved to one position or another.

This broad principle of our invention is shown for the purpose of illustration embodied in a valve particularly adapted for use in a combination bath and shower installation wherein it is required to divert hot or cold water or any mixture of the two to discharge from a suitable spout into the bath tub or to discharge from a suitable shower head.

This valve in its present embodiment comprises a valve body B constructed to provide therein a chamber C of cylindrical form, having a pair of inlets 10 and 11 diametrically opposed and formed respectively by internally threaded nipples 12 and 13 to which are adapted to be connected, pipes 14 and 15 respectively, one of which leads from a source of cold water supply and the other from a source of hot water supply. Suitable valves (not shown) are adapted to be provided to control the flow of hot and cold water from the pipes 14 and 15 to the chamber C, to the end that either hot or cold water can be admitted to the chamber to the exclusion of the other, or any proportion of hot and cold water can be admitted to the chamber for mixing therein.

One end wall of the chamber C is open to provide a port constituting an outlet 16 communicating with a passage 17 formed in the body B and terminating in a nipple 18 to which is adapted to be connected a pipe 19 leading to a shower head (not shown) while the other end wall of the chamber is also open to provide a second port constituting an outlet 20 which communicates with the interior of a hollow cylindrical extension 21 forming part of the valve body B.

From a side of the extension 21 leads a passage 22 terminating in a nipple 23 diametrically opposed to the nipple 18 and to which is adapted to be connected a pipe 24 leading to a suitable bath tub spout (not shown).

The outlets 20 and 16 are controlled by valves V and V' respectively, which latter are adapted to be operated by a single actuating means designated generally at A, to close one outlet and open the other or vice versa so that water from the chamber C can be diverted to either the pipe 19 or 24 to the exclusion of the other.

The valve V in the present embodiment is in the form of a disk 25 recessed on one face to receive a gasket 26 clamped to the disk by a nut 27 threaded on a reduced externally threaded projection 28 formed on the disk and extending through a central opening in the gasket. The valve V is provided with an externally threaded portion 29 threaded into a nut 30 in the form of an internally threaded sleeve having a circular flange 31 seating in an annular recess 32 formed in the extension 21, the nut having a pair of diametrically opposed lugs 33 seating in grooves 34 formed in the wall of the extension 21, to the end that the nut will be fixed against rotation in the body B.

The nut is clamped against endwise displacement in the body by means of a cap 35 bearing against the flange 31 and threaded into the open end of the extension as indicated at 36 to form a closure for the extension.

In the cap 35 is a conventional packing gland 37 through which extends a stem 38 fixed at its inner end to the threaded portion 29 of the valve V, and provided at its end with an operating knob 39, which with the stem 38 constitutes, in the present instance, the actuating means A above referred to. It will be clear that rotation of the stem 38 in one direction or the other will cause the valve V to be fed by the nut 30 in one direction or the other.

The valve V' in the present instance is in the form of a disk to one face of which is secured by a screw 40, a gasket 41, the valve V' having a portion 42 threaded externally and oppositely to the portion 29 of the valve V, the portion 42 being illustrated as provided with left hand threads and the portion 29 with right hand threads.

The portion 42 of the valve V' is threaded into a nut 43 in the form of an open ended sleeve having an enlarged externally threaded flange 44 threaded into the wall of the opening in the chamber C constituting the outlet 20, the nut extending into the chamber C and being disposed in alinement with the nut 30. The nut 43 is provided with a further enlarged flange 45 having an angular wrench receiving pocket 46 into which a suitable instrument is adapted to be inserted to screw the nut 43 sufficiently tight to insure that it will be fixed against rotation in the body B. The nut 43 is provided with a circular series of openings or ports 47 through which water from the chamber C can discharge therefrom through the nut into the extension 21 when the valve V is open.

The valve V is provided axially with a socket 48 non-circular in cross section and illustrated as being square, the socket slidably receiving a stem 49 projecting axially from the portion 42 of the valve V' so as to provide a splined connection between the valves by which the latter are operatively connected for rotary movement as a unit, yet can move towards or away from each other under the action of the reversely threaded nuts 30 and 43 according as the valves are rotated as a unit in one direction or the other. It will be clear that the nuts 30 and 43 and the portions 29 and 42 of the valves V and V' respectively, broadly constitute a means by which the valve V is caused to close the outlet 16 and the valve V' to open the outlet 20 or vice versa according as the valves are rotated as a unit in one direction or the other, the valve V when in closed position engaging an annular bead formed on the outer face of the nut 43 and constituting an annular valve seat 50, and the valve V' when in closed position engaging an annular bead formed in the chamber C in surrounding relation to the outlet 16 and constituting an annular valve seat 51, to the end that when the valves occupy their closed positions a fluid-tight joint will be effected between the gaskets of the valves and the respective seats.

Figure 2:
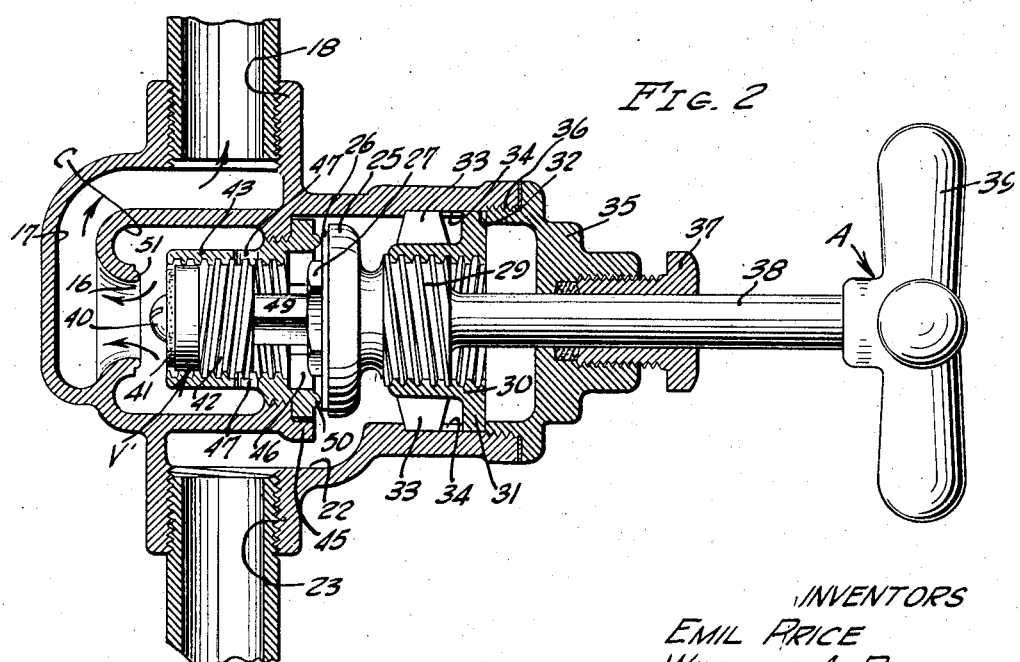
Fig. 2 is a view similar to Fig. 1 and illustrating another position of the valve.

In operation, it will be clear that with the valve V open and the valve V' closed as shown in Fig. 1, water from the chamber C will be free to flow through the ports 30 into the interior of the extension 21 and thence through the passage 22 into the pipe 24 to the bath tub spout as indicated by the arrows in this figure. However, upon rotating the knob 39 in the direction of the arrow a, Fig. 1, the valves V and V' will be correspondingly rotated as a unit through the medium of their operative connection, and will be fed towards each other as a result of the reverse threading of the nuts 30 and 43 to cause the valve V to move to closed position and the valve V' to open position as shown in Fig. 2. Water from the chamber C will now discharge through the outlet 16 to the passage 17 and thence into the pipe 19 to the shower head.

Although we have herein shown and described only one form of valve embodying our invention, it is to be understood that various changes and modifications may be made therein without departing from the spirit of the invention and the spirit and scope of the appended claims.

We claim:

1. A diverting valve comprising a body having a chamber provided with an inlet and a pair of outlets, valves controlling the outlets, the valves being reversely threaded in the body for rotation about a common axis, means for operatively connecting the valves for rotation as a unit, yet allowing movement of the valves towards and away from each other to cause one valve to open its respective outlet and the other valve to close its respective outlet or vice versa according as the valves are rotated in one direction or the other.

2. A diverting valve as embodied in claim 1 wherein said means for operatively connecting the valves comprises a stem on one of the valves having a splined connection with the other valve.

3. A diverting valve as embodied in claim 1 wherein said means for operatively connecting the valves comprises a socket of non-circular cross-section in one of the valves and a non-circular stem on the other valve, slidably fitted in the socket.

4. A diverting valve comprising a body having a chamber provided with an inlet and a pair of outlets, valves controlling the outlets, the valves being reversely threaded in the body for rotation about a common axis, co-acting means on the valves by which the latter are operatively connected for rotation as a unit yet can move bodily relatively to each other so that one valve will open its respective outlet and the other valve close its respective outlet or vice versa according as the valves are rotated in one direction or the other, and means for actuating the valves.

5. A diverting valve comprising a body having a chamber provided with an inlet and a pair of oppositely disposed outlets, valve seats surrounding the outlets on one and the same side of the latter, disk-like valves for controlling the outlets, means for mounting the valves for rotary movement about a common axis and operating to feed one valve into engagement with one of the valve seats and the other valve out of engagement with the other valve seat or vice versa according as the valves are rotated as a unit in one direction or the other, to thereby close one outlet and open the other or vice versa, means for operatively connecting the valves for rotary movement as a unit, and a single actuator for the valves.

6. A diverting valve comprising a body having a chamber provided with an inlet and a pair of outlets, valves for controlling the outlets, nuts, one for each of the valves fixed in the body in alinement with each other, one of the nuts having right hand threads and the other left hand threads, the valves having threaded portions threadedly mounted in said nuts, means for operatively connecting the valves for rotary movement as a unit and allowing movement of the valves towards and away from each other under the action of the reversely threaded nuts to cause one valve to close its respective outlet and the other valve to open its respective outlet or vice versa according as the valves are rotated in one direction or the other, and means for actuating one of the valves.

7. A diverting valve as embodied in claim 6 wherein said means for operatively connecting the valves comprises an axial socket of non-circular cross section in one of the valves, and a stem on the other valve slidably fitting the socket.

8. A valve having a pair of ports, valves controlling the ports, means for operatively connecting the valves for rotary movement as a unit, means for mounting the valves for rotary movement and movement relatively to each other in response to rotary movement as a unit, to cause one valve to close one of the ports and the other valve to close the other port according as the valves are rotated in one direction or the other, and a single actuating means for the valves, said means for operatively connecting the valves comprising a socket of non-circular cross-section in one of the valves, and a stem of non-circular cross-section on the other valve slidably fitting in the socket.

9. A valve having a pair of ports, valves controlling the ports, means for operatively connecting the valves for rotary movement as a unit, means for mounting the valves for rotary movement and movement relatively to each other in response to rotary movement as a unit, to cause one valve to close one of the ports and the other valve to close the other port according as the valves are rotated in one direction or the other, and a single actuating means for the valves, said mounting means for the valves comprising a pair of stationary nuts threaded in reverse directions with respect to each other and with which the valves have threaded engagement.

10. A valve having a pair of ports, valves controlling the ports, means for operatively connecting the valves for rotary movement as a unit, means for mounting the valves for rotary movement and movement axially in opposed directions relatively to each other in response to their rotary movements, to cause one valve to close one of the ports and the other valve to close the other port according as the valves are rotated in one direction or the other, and a single actuating means for the valves.

11. A diverting valve having a chamber provided with an inlet and a pair of outlets, valves controlling the outlets, means for operatively connecting the valves for rotary movement as a unit, means for mounting the valves for rotary movement and movement relatively to each other to cause the valves to open one outlet and close the other or vice versa, according as the valves are rotated in one direction or the other, and a common actuating means for the valves.

Signed at Los Angeles, in the county of Los Angeles, and State of California this 31st day of July, A. D. 1928.

EMIL PRICE.
WILLIAM A. PFISTER.